(12) United States Patent
Boest

(10) Patent No.: US 9,932,496 B2
(45) Date of Patent: Apr. 3, 2018

(54) LIQUEFIED WOOD COATING

(71) Applicant: Advanced Wood Paint, LLC, Grayson, GA (US)

(72) Inventor: Christopher R. Boest, Grayson, GA (US)

(73) Assignee: ADVANCED WOOD PAINT, LLC, Atlanta, GA (US)

( * ) Notice: Subject to any disclaimer, the term of this patent is extended or adjusted under 35 U.S.C. 154(b) by 272 days.

(21) Appl. No.: 14/601,932

(22) Filed: Jan. 21, 2015

(65) Prior Publication Data

US 2015/0225610 A1     Aug. 13, 2015

Related U.S. Application Data

(60) Provisional application No. 61/939,051, filed on Feb. 12, 2014.

(51) Int. Cl.
| | |
|---|---|
| *C09D 197/00* | (2006.01) |
| *C09D 197/02* | (2006.01) |
| *C09D 15/00* | (2006.01) |
| C09D 133/00 | (2006.01) |

(52) U.S. Cl.
CPC ........... *C09D 197/02* (2013.01); *C09D 15/00* (2013.01); *C08L 2205/18* (2013.01); *C09D 133/00* (2013.01); *Y10T 428/253* (2015.01)

(58) Field of Classification Search
CPC ...................................................... B29C 70/58
See application file for complete search history.

(56) References Cited

U.S. PATENT DOCUMENTS

| | | | | |
|---|---|---|---|---|
| 1,971,036 A | * | 8/1934 | Graham | ............... D06N 7/0039 427/195 |
| 3,755,271 A | * | 8/1973 | Montgomery | ........ C08F 214/06 524/32 |
| 4,103,056 A | * | 7/1978 | Baratto | ..................... B44C 3/12 428/106 |
| 4,267,089 A | | 5/1981 | Brown | |
| 4,345,044 A | | 8/1982 | Columbus et al. | |
| 4,670,500 A | * | 6/1987 | Gupta | .................. C09D 183/08 524/447 |
| 4,980,402 A | | 12/1990 | Cope | |

(Continued)

FOREIGN PATENT DOCUMENTS

| | | |
|---|---|---|
| EP | 0373882 A2 | 6/1990 |
| WO | 00/18839 A1 | 4/2000 |

OTHER PUBLICATIONS

HandyMac, http://ths.gardenweb.com/discussions/2648020/stainable-wood-fillernot; Published Dec. 19, 2006; Retrieved May 26, 2017; pp. 1-12.*

(Continued)

*Primary Examiner* — Francisco W Tschen

(74) *Attorney, Agent, or Firm* — Thomas | Horstemeyer, LLP

(57) ABSTRACT

Disclosed are various embodiments relating to a liquefied wood coating that can be applied to virtually any surface. The liquefied wood coating contains a micronized wood powder, a non-elastomeric resin with high adhesion properties, and an elastomeric resin for flexibility. Once dried, the wood coating accepts stain, polyurethane, and other types of coatings to provide a real wood finish.

19 Claims, 1 Drawing Sheet

(56) References Cited

U.S. PATENT DOCUMENTS

| | | | | |
|---|---|---|---|---|
| 2002/0007898 A1* | 1/2002 | Spica | ............... | B05D 1/20 |
| | | | | 156/180 |
| 2002/0123541 A1* | 9/2002 | Hughes | ............... | C08F 265/06 |
| | | | | 524/13 |
| 2006/0151531 A1* | 7/2006 | Tikusis | ............... | B01F 5/0603 |
| | | | | 222/145.6 |
| 2008/0311383 A1 | 12/2008 | Richardson et al. | | |
| 2013/0217810 A1 | 8/2013 | Laursen | | |

OTHER PUBLICATIONS

Barb, http://www.designsponge.com/2010/09/before-and-after-basics-wood-filler.html, Published Oct. 2, 2010; Retrieved May 26, 2017, pp. 1-6.*

Bailey, http://www.prettyhandygirl.com/this-whole-post-is-on-repairing-holes; Published Jul. 29, 2010; Retrieved May 26, 2017, pp. 1-15.*

Bailey, http://www.prettyhandygirl.com/aging-is-so-distressing-techniques-for/; Published Sep. 7, 2010; Retrieved May 29, 2017, pp. 1-15; Bailey2.*

Supplementary European Search Report for EP 15 74 9425 dated Sep. 25, 2017.

Agarwal, et al., "Mechanical Properties of Acrylic Based Latex Blend Coatings", Polymer Engineering and Science, Feb. 2000, vol. 40, No. 2. pp. 376-390.

Australian Examination Report No. 1 for Standard Patent Application No. 2015217448 dated Dec. 20, 2017.

* cited by examiner

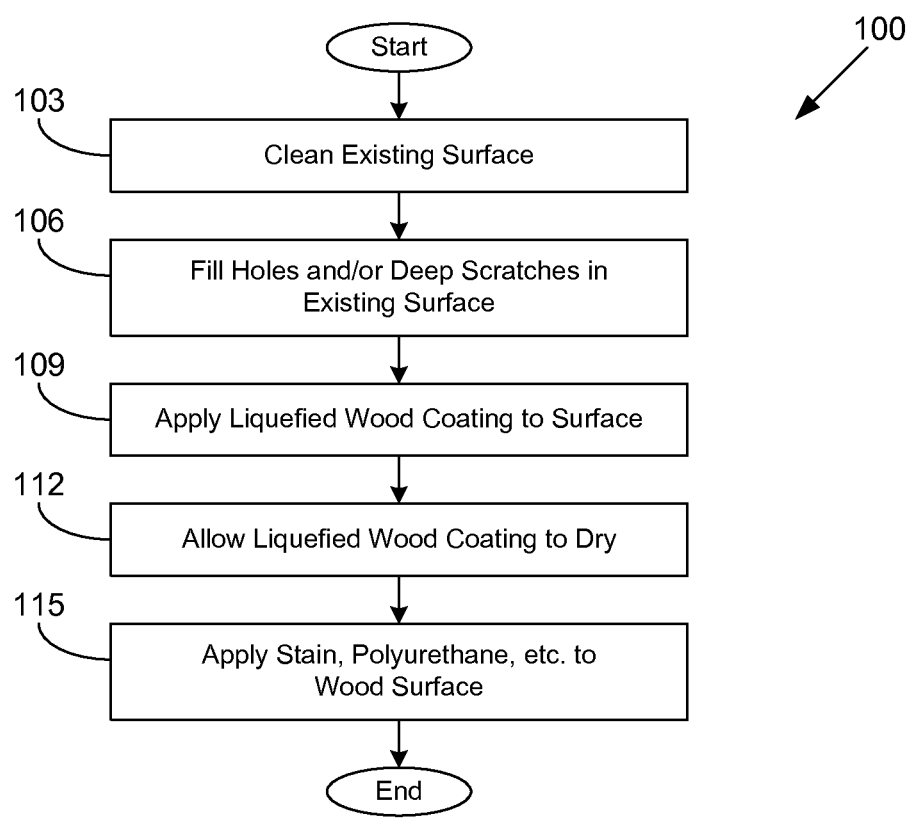

LIQUEFIED WOOD COATING

CROSS-REFERENCE TO RELATED APPLICATION

This application claims the benefit of U.S. Provisional Application No. 61/939,051, filed on Feb. 12, 2014, which is incorporated herein in its entirety.

BACKGROUND

People often wish to refinish cabinetry, furniture, and other decorative surfaces. For example, the finishes may become worn, or they may simply be outdated. Sometimes, where the surface is wood, the surface may be stripped and/or sanded down and a new finish may be applied. Such a process may be labor intensive and messy. In some cases, the surface may be merely a veneer or laminate, and the only refinishing possible may be to paint or to place a new laminate layer. Faux finish paint systems are expensive, and they require multiple steps and professional application to create a simulated wood finish. Due to these limitations, people often choose to replace their cabinetry, furniture, etc., rather than go through the expense and hassle of refinishing.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a flowchart illustrating one example of a process of use for a liquefied wood coating according to an embodiment of the present disclosure.

DETAILED DESCRIPTION

The present disclosure relates to a liquefied wood coating that may be used as a stainable primer. Creating a stained wood finish on a bare, non-wood surface or a painted surface may be difficult and expensive. It may involve stripping a painted surface down to the original wood surface and refinishing. Non-wood surfaces may require professional faux finishes or expensive manufacturing laminating processes to create a wood finish on a non-wood surface. The coating described herein allows anyone to brush, spray, roll on, drip on, or otherwise apply a layer of liquefied wood that, when dry, allows the user to apply any available wood stain, creating the look of a real wood finish.

The liquefied wood coating described herein may be applied via a single step process that is easy to use for the average non-professional user. It is cost effective and provides a real wood stainable surface for most clean and hard surfaces. By contrast, faux finish paint systems create a simulated, near wood appearance by layering many different paints and glazes to give a wood-like appearance, not a real wood coating. Faux finish paint systems are difficult to use and require many steps to complete the process. The liquefied wood coating described herein dries quickly and creates a wood layer that can be stained with any commercially available stain. The components of the liquefied wood coating will next be described.

The components of the liquefied wood coating include a micronized wood powder and a blend of two different resins: (1) an extremely high performance, non-elastomeric adhesive resin that dries very hard with high stick qualities and (2) an elastomeric resin to provide flexibility. The resin blend has a small particle size with a low demand for co-solvent. For example, an acrylic resin may be used for the hard resin, and an elastomeric vinyl acrylic resin may be used for the flexible resin. The blend of the two different resins provides high adhesion plus flexibility. For example, a formulation of 15-35% vinyl acrylic resin and 5-20% acrylic resin may be selected by weight. The proportion of resins is selected to provide high enough adhesion while still allowing for absorption into the wood particles. Higher resin content translates into a lower absorbability.

In various embodiments, the hardness of the liquefied wood coating that has been applied and dried may be quantified using the ASTM D3363 Standard Test Method for Film Hardness by Pencil Test, thereby producing a result of "HB" (softer) to "H" (harder). In various embodiments, the adhesion of the liquefied wood coating that has been applied to a previously painted surface and has dried may be quantified using the ASTM D3359 Standard Test Methods for Measuring Adhesion by Tape Test, specifically using the crosshatch adhesion method, thereby producing a result of "3B" (slight separation of the surface) to "5B" (no failure). In various embodiments, the flexibility of the liquefied wood coating that has been applied to a metal surface and has dried may be quantified using ASTM D522 Standard Test Methods for Mandrel Bend Test, specifically the conical mandrel method, which may produce a result of no failure. In various embodiments, the minimum film forming temperature may be less than zero.

The liquefied wood coating may also include normal paint fillers, which can include a lacquer base, a naphtha base, or a water base. For example, lacquer may be avoided in houses for safety reasons, but otherwise it is quick to dry compared to water. In one embodiment, the liquefied wood coating may be formulated as a caulk. The caulk may be formulated in an elastomeric acrylic with a proper blend of wood powder to create an environment that would accept stain.

The micronized wood powder comprises fine wood particles. The wood particles used in the liquefied wood coating are preferably smaller than 200 mesh. In some instances, the wood particles may be selected to be smaller than 400 to 1500 mesh. It is understood that the wood particles used in the liquefied wood coating may be a blend of different particle sizes. That is to say, when incorporating 200 mesh wood particles into the liquefied wood coating, there may be some wood particles of greater size than 200 mesh in the mixture, but the mixture substantially comprises particles smaller than 200 mesh. In varying the size of the wood particles, properties of the liquefied wood coating may also change.

The wood particles may be from various wood species. For example, oak, maple, walnut, pine, spruce, eucalyptus, walnut shell, almond, almond shell, balsa, pecan, pecan shell, ash, mahogany, and other wood species may be used. Different woods may have slightly different properties. In some cases, the wood particles used in the liquefied wood coating may comprise a blend of woods from different species. The color of the liquefied wood coating may be described as a generic wood color. Small percentages of pigments (e.g., between 1% and 4% of pre-dispersed pigments (waterborne pigments for waterborne systems and industrial solvent pigments for solvent-based systems) may be added to produce different wood colors. However, it is noted that a light wood color will allow for a choice of stain colors.

The liquefied wood coating described herein will bond to almost any solid surface. Such surfaces may include, but are not limited to, wood, medium density fiberboard (MDF), particleboard, gypsum board, plastic, fiberglass, glass, fiber cement board, vinyl composition tile, metal, ceramic, polyvinyl chloride (PVC) trim, masonry, leather, a previously stained surface, a previously painted surface, and other surfaces. When dried, the liquefied wood coating does not come off unless scraped off.

The thickness of the coating depends on the amount of absorption. In one embodiment, applying the liquefied wood coating results in a 0.5-3 mil thickness wood composition upon the surface to which it is applied. This wood composition also has filler properties and can level out minor imperfections in the surface. For example, the wood composition can fill imperfections by using multiple coats. This wood composition absorbs stain into the wood like real wood. The dried wood coating can accept other coatings besides stain, including paint, polyurethane, and other coatings. Thus, the dried wood coating may be used as a primer for paint, etc., due to its opacity and filler properties. Upon drying, 50-60% by weight of the coating may remain on the surface.

Different applicators may give different surface results. For example, applying the liquefied wood coating with a paintbrush may result in brush strokes that mimic real wood grain when stain is applied. In some cases, scuffing of the dried surface may be used to mimic wood grain. If a sprayer is used, there will be no brush strokes and hence a grainless appearance. Thus, the finished appearance may be varied depending on the method of application.

A method of use will next be described with reference to FIG. 1. The flowchart 100 of FIG. 1 illustrates one example application of the liquefied wood coating to a surface. Beginning with box 103, the existing surface is cleaned and allowed to dry. In box 106, holes, deep scratches, and/or other imperfections in the existing surface are filled in. For example, a filler product that does not contain silicone may be used. In box 109, the liquefied wood coating is applied to the surface. Application may be by way of a brush, rag, sprayer, curtain coater, drip coater, roller, or other applicator. In some cases, an object having the surface may be immersed in the liquefied wood coating. For example, the coating may be between 0.5 and 3 mils thick. In box 112, the liquefied wood coating is allowed to dry, e.g., approximately two hours. In box 115, stain, paint, polyurethane, and/or additional coatings are applied to the dried wood surface. The micronized wood particles within the dried wood surface will absorb the stain, paint, polyurethane, etc. The flowchart 100 then ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for applying a finish to a surface, comprising:
   applying a liquefied wood coating to the surface using at least one of: a brush, a rag, a sprayer, a curtain coater, a drip coater, or a roller, the liquefied wood coating including micronized wood particles, an elastomeric resin, and a non-elastomeric adhesive resin, wherein the micronized wood particles of the liquefied wood coating consist of wood particles having a size of 200 mesh or smaller, and the liquefied wood coating is capable of absorbing a wood stain after drying; and
   after the liquefied wood coating dries upon the surface, applying a second coating to the surface for absorption by the micronized wood particles.

2. The method of claim 1, further comprising, after the second coating dries upon the surface, applying a sealing coating to the surface.

3. The method of claim 1, wherein the second coating comprises the wood stain.

4. The method of claim 1, wherein the second coating comprises a paint.

5. The method of claim 1, wherein the surface is a non-wood surface selected from the group consisting of: a plastic surface, a medium density fiberboard (MDF) surface, a masonry surface, a glass surface, a ceramic surface, a leather surface, and a metal surface.

6. The method of claim 1, wherein the surface is a gypsum board surface.

7. The method of claim 1, wherein the micronized wood particles of the liquefied wood coating substantially consist of wood particles from hardwood species.

8. The method of claim 1, wherein the liquefied wood coating further comprises a base selected from the group consisting of: a lacquer base, a naphtha base, and a water base.

9. The method of claim 1, wherein the non-elastomeric adhesive resin is an acrylic resin, and the elastomeric resin is an acrylic vinyl elastomeric resin.

10. The method of claim 9, wherein the liquefied wood coating consists of 5-20% of the acrylic resin and 15-35% of the acrylic vinyl elastomeric resin by weight.

11. The method of claim 1, wherein the micronized wood particles comprise at least one of: oak wood particles, maple wood particles, or walnut wood particles.

12. The method of claim 1, wherein a hardness of the liquefied wood coating that has dried measures in a range of "HB" to "H" using the ASTM D3363 Standard Test Method for Film Hardness by Pencil Test.

13. The method of claim 1, wherein the surface is a previously painted surface, and an adhesion to the previously painted surface of the liquefied wood coating that has dried measures in a range of "3B" to "5B" using a crosshatch adhesion method of the ASTM D3359 Standard Test Methods for Measuring Adhesion by Tape Test.

14. The method of claim 1, wherein the surface is a metal surface, and an adhesion to the metal surface of the liquefied wood coating that has dried produces a result of no failure using a conical mandrel method of the ASTM D522 Standard Test Methods for Mandrel Bend Test.

15. The method of claim 1, wherein the micronized wood particles of the liquefied wood coating substantially consist of wood particles having a size of 1500 mesh or smaller.

16. The method of claim 1, wherein the liquefied wood coating further comprises a pre-dispersed pigment.

17. The method of claim 1, wherein the liquefied wood coating that has dried measures in thickness 0.5 to 3 mils.

18. The method of claim 1, further comprising scuffing the liquefied wood coating that has dried to mimic wood grain before applying the second coating.

19. A method for applying a finish to a surface, comprising:
   applying a liquefied wood coating to the surface, the liquefied wood coating including micronized wood particles, an elastomeric resin, and a non-elastomeric adhesive resin, wherein the micronized wood particles of the liquefied wood coating consist of wood particles having a size of 200 mesh or smaller, and the liquefied wood coating is capable of absorbing a wood stain after drying;

after the liquefied wood coating dries upon the surface, applying a second coating to the surface for absorption by the micronized wood particles; and wherein upon drying less than 60 percent by weight of the liquefied wood coating remains on the surface.

* * * * *